United States Patent [19]

Weit

[11] 4,199,800
[45] Apr. 22, 1980

[54] BRUSHLESS DC TACHOMETER

[75] Inventor: James G. Weit, Pittsburgh, Pa.

[73] Assignee: Contraves Goerz Corporation, Pittsburgh, Pa.

[21] Appl. No.: 901,419

[22] Filed: May 1, 1978

[51] Int. Cl.² .............................................. G01P 3/54
[52] U.S. Cl. .................................. 361/239; 361/240; 361/263; 361/287; 340/200; 324/163; 318/327
[58] Field of Search ............... 361/239, 240, 263, 287, 361/298, 299, 300; 324/163, 165, 166, 61 R; 318/618, 138, 327, 662; 340/200

[56] References Cited

U.S. PATENT DOCUMENTS

| | | | |
|---|---|---|---|
| 3,729,728 | 4/1973 | Hardway, Jr. | 340/200 |
| 3,760,392 | 9/1973 | Stich | 318/138 |
| 3,848,157 | 11/1974 | Kripl | 361/239 |
| 3,858,109 | 12/1974 | Liden | 318/327 |
| 4,039,946 | 8/1977 | Nola | 324/163 X |
| 4,074,339 | 2/1978 | Turnbull | 361/239 |
| 4,092,579 | 5/1978 | Weit | 361/287 X |

OTHER PUBLICATIONS

"Capacitive Transducers," Lion and Foldvari, *Instruments and Control Systems*, vol. 37, Nov. 1974, pp. 77–85.

"Position Sensor ...," *Electronics*, E. V. Hardway Jr., Aug. 16, 1971, pp. 86–88.

*Primary Examiner*—J. D. Miller
*Assistant Examiner*—L. C. Schroeder
*Attorney, Agent, or Firm*—Robert D. Yeager

[57] ABSTRACT

A brushless tachometer is disclosed which provides a DC output voltage which is a direct function of an instrumented shaft's rotational velocity. The DC voltage is bi-directional, changing sign when the shafts direction of rotation is reversed. The disclosed tachometer preferably utilizes a brushless printed circuit resolver having a large number of poles. The sine and cosine outputs from the resolver are fed to a phase shifting circuit which provides two output signals whose frequencies are related to the speed of rotation of the shaft being instrumented. The frequency of one of the signals increases as the shaft speed increases while the frequency of the other signal decreases as the shaft speed increases. These two signals having frequencies related to shaft speed are fed to frequency to voltage converters. The outputs from the frequency to voltage converters are fed to a differential amplifier whose output is the DC signal which is indicative of the direction and the speed of rotation of the shaft.

8 Claims, 6 Drawing Figures

BRUSHLESS DC TACHOMETER

BACKGROUND OF THE INVENTION

1. Field of the Invention

This invention relates to speed transducers for a rotatable shaft and more particularly to a brushless tachometer which provides a DC voltage indicative of shaft speed and direction of rotation.

2. Description of the Prior Art

Brushless speed indicators are utilized for many drives wherein, due to specific conditions, no commutators or brushes may be considered for use, or where a speed indicator free from maintenance is required. Applicant is unaware of any prior art which teaches using a multi-pole printed circuit resolver to provide a signal which is processed to yield a bi-directional speed indication. Several prior art brushless tachometers are known which utilize rotatable inductors or rotatable permanent magnets. Most prior art tachometers are AC and provide no polarity change for the change in the direction of rotation.

U.S. Pat. No. 3,839,665 discloses a transducer which is coupled to a motor shaft to provide both position and velocity information.

U.S. Pat. No. 3,604,869 discloses a device which produces a direct voltage speed indication. The device of U.S. Pat. No. 3,604,869 utilizes a multi-phase AC voltage machine having a rotatable inductor.

U.S. Pat. No. 3,508,137 teaches a brushless DC tachometer which is constructed with a permanent magnet rotor which generates a flux field which cuts conductors of stator windings to induce voltages therein. This tachometer utilizes a plurality of photo transistors to improve the output linearity of the tachometer. U.S. Pat. No. 3,858,109 teaches a brushless tachometer having a multi-pole permanent magnet rotor and a two phase stator.

U.S. Pat. No. 3,848,157 teaches a brushless DC tachometer. This tachometer does not use a position sensing device for providing the information which is processed to yield the speed signal.

SUMMARY OF THE INVENTION

A brushless DC tachometer is disclosed which utilizes the output signal from a multi-pole brushless resolver to provide a bi-directional DC speed indication. The disclosed tachometer utilizes a single position transducer without a separate voltage generating means. This invention can be practiced with any transducer which can produce guadrature outputs. In accordance with conventional resolver practice an input carrier or modulating signal from an oscillator is provided to the resolver. In a preferred embodiment a multi-pole brushless resolver is connected to the shaft whose speed is to be determined. The resolver provides modulated output signals, in sine and cosine form indicative of the shaft position. The envelope of the carrier defines the sine and cosine functions. The carrier signal is of a relatively high frequency compared to the speed with which the shaft can rotate. The sine and cosine functions in modulated carrier form are supplied to a phase shifting or side band enhancing circuit. The outputs of the side band enhancing circuit provides signals which have a frequency related to the speed and direction of rotation of the shaft to be instrumented. The two signals have frequencies which are a function of the carrier frequency, the number of resolver poles and shaft speed. One of the signals has a constant frequency component determined by the carrier frequency and a variable frequency component which is directly related to shaft speed. The other signal has a constant frequency component determined by the carrier frequency and a variable frequency component which is inversely related to shaft speed. The output signals from the phase shifting or side band enhancing circuit are applied to frequency to voltage converters. The output signals from the frequency to voltage converters are fed through low pass filters to remove the carrier signal component. The resulting signals are then differentially combined to provide a DC output voltage which is representative of the speed of the shaft to be instrumented.

The brushless resolver utilized preferably is of the capacitance coupled variety utilizing printed circuit components. With this style of resolver a large number of poles can easily be obtained. U.S. Pat. No. 3,961,318 issued June 1, 1976 to R. W. Farrand discloses a resolver which is suitable for practicing the present invention.

It is an object of this invention to teach a relatively inexpensive brushless DC tachometer.

It is a further object of this invention to teach a brushless DC tachometer which utilizes a multi-pole printed circuit capacitive coupled resolver.

BRIEF DESCRIPTION OF THE DRAWINGS

For a better understanding of the invention reference may be had to the preferred embodiments exemplary of the invention shown in the accompanying drawings in which.

DESCRIPTION OF THE PREFERRED EMBODIMENT

Figure 1:
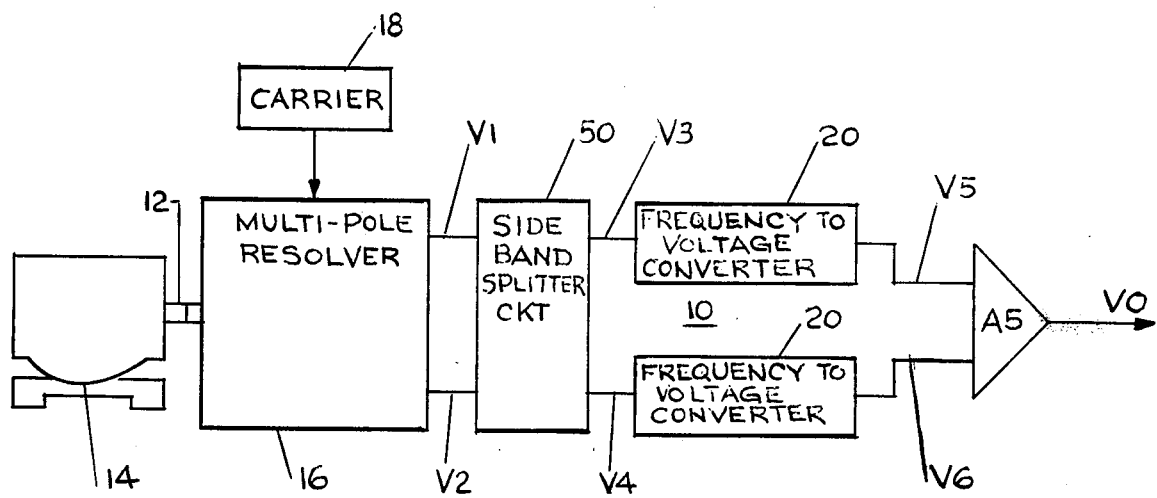
FIG. 1 is a diagrammatic view of a DC tachometer constructed according to the teaching of the present invention.

Referring now to the drawings and FIG. 1 in particular there is shown a tachometer 10 constructed according to the teaching of the present invention. Tachometer 10 provides a DC output voltage $V_0$ which is indicative of the speed of rotation of shaft 12. Shaft 12 can be connected for example to a servo motor 14. A multi-pole resolver 16 is connected to shaft 12 to provide analog voltage signals in suppressed carrier sine-cosine form which are dependent on positioning of shaft 12. An oscillator 18 is connected to resolver 16 and provides a carrier or modulating frequency signal. The magnitude of the carrier envelope provides the sine and cosine position indicating information. The carrier frequency is relatively high compared to the shaft rotational frequency. The output voltages $V_1$ and $V_2$ are connected to a phase shifting or side band splitter circuit which provides two output voltages $V_3$ and $V_4$ whose frequencies are related to the angular frequency of shaft 12. The frequencies of voltage signals $V_3$, $V_4$ are a function of the carrier frequency, the number of resolver 16 poles, and the speed of shaft 12. One of the voltage signals $V_3$ or $V_4$ has a frequency which increases with increasing shaft speed while the other voltage signal $V_3$ or $V_4$ has a frequency which decreases with increasing shaft speed. The frequency of one voltage signal $V_3$ or $V_4$ is a composite signal having a constant frequency component, determined by the carrier frequency, and a variable component, directly related to shaft speed; while the frequency of the other voltage signal $V_4$ or $V_3$ is a composite signal having a constant frequency component, determined by the carrier frequency, and a variable frequency component, inversely related to shaft speed. Which voltage signal $V_3$, $V_4$ increases with shaft speed and which voltage signal $V_3$, $V_4$ decreases with shaft speed is determined by the direction of rotation of shaft 12.

The output signals $V_3$ and $V_4$ from side band splitter circuit 50 are fed to frequency to voltage converters 20. The output voltage signals $V_5$, $V_6$ from frequency to voltage converters 20 are composite signals each having a DC component related to the carrier frequency and a DC component related to the shaft speed. The output voltages $V_5$ and $V_6$ from frequency converters 20 are fed to a differential amplifier $A_5$ where they are combined to produce an output voltage $V_0$. When signals $V_5$ and $V_6$ are differentially combined the carrier components are eliminated. Output voltage $V_0$ is a DC voltage which is bi-directional and whose amplitude is representative of the speed of shaft 12. The sign of signal $V_0$ indicates the direction of rotation of shaft 12.

Figure 2:
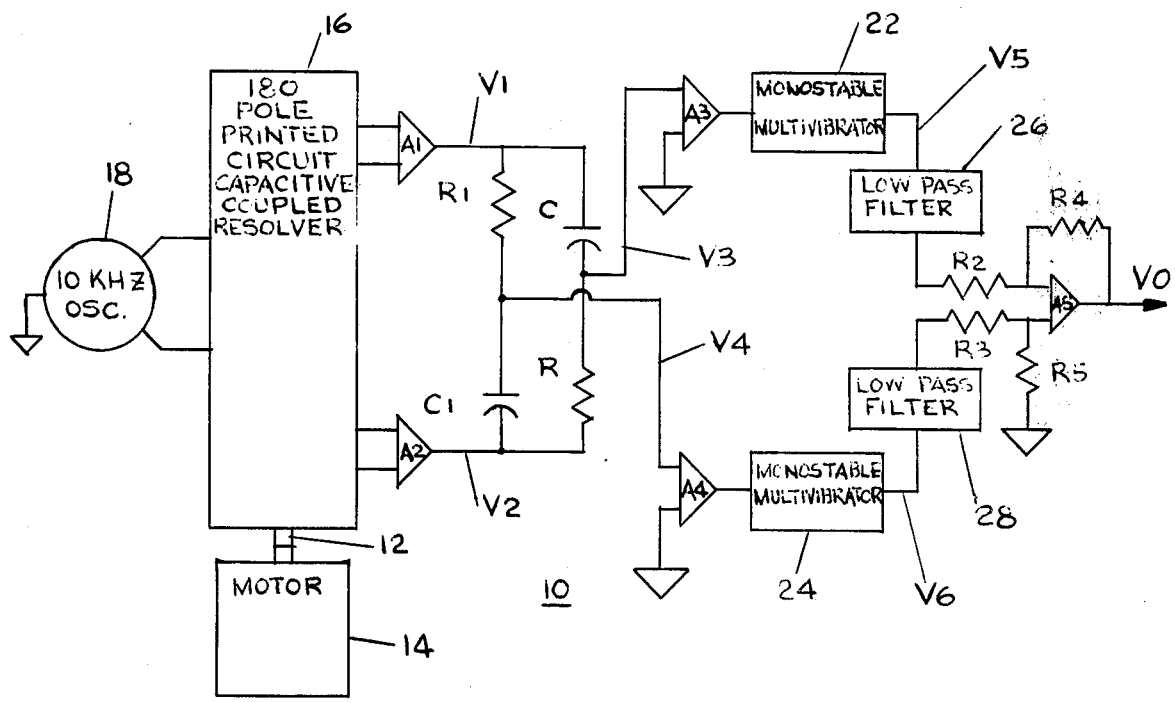
FIG. 2 is a schematic showing in more detail the circuitry of the tachometer shown in FIG. 1.
Figure 3:
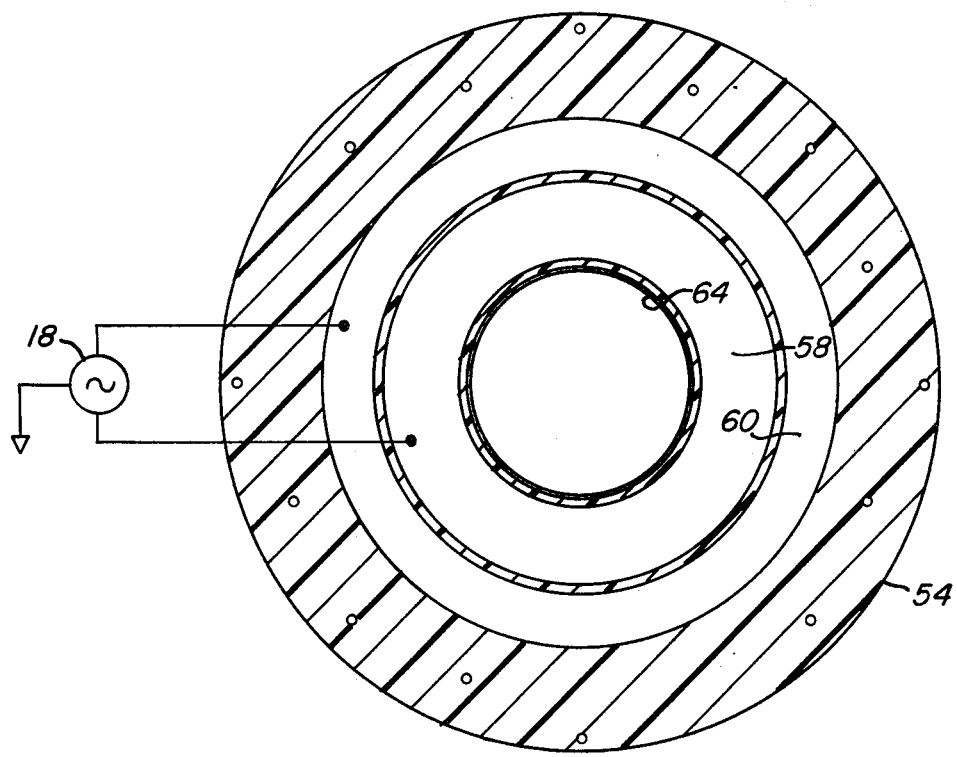
FIG. 3 is a view of an input stator member for a suitable capacitive coupled brushless resolvers.

Referring now to FIG. 2 there is shown a more detailed diagram of a brushless tachometer 10. A 10 KHz oscillator 18 provides the carrier input signal to resolver 16. The carrier input signal is equal to $V_c \cos \omega t$. the 180 pole printed circuit capacitive coupled resolver is of the type described in copening U.S. Pat. No. 4,092,579. The teachings of U.S. patent application Ser. No. 750,907 are herein incorporated by reference. The number of poles on the resolver utilized in this application is much greater than on the resolver described in the above-identified copending application. However, the number of poles on a printed circuit capacitive coupled resolver can easily be varied over a wide range. FIGS. 3 through 6 show the various printed circuit components which can be assembled to provide a 180 pole printed circuit capacitive coupled resolver.

Referring now to the drawings and FIGS. 3 through 6 there is shown a 180 cycle brushless resolver. The resolver provides 180 complete output cycles for each revolution of the instrumented shaft 12. Two stationary members 54 and 56 are provided with a movable member 52 sandwiched therebetween. Movable member 52 is attached to the shaft whose speed is to be instrumented while stationary members 54 and 56 are disposed so that the shaft 12 extends therethrough. The input stator 54 has two concentric metallic foils 58 and 60 formed thereon. The stationary input member 54 is formed from an insulating material. An input carrier signal is applied across foils 58 and 60 from oscillator 18. The frequency of oscillator 18, 10 KHz, is high with respect to the speed of rotation of shaft 12. The rotor 52 of the brushless resolver is connected to shaft 12 whose speed is to be determined. Stationary member 54 has a clearance hole 64 formed therethrough for the clearance of rotatable shaft 12. Stationary input member 54 is disposed with foils 58 and 60 facing towards rotary member 52.

Figure 4:
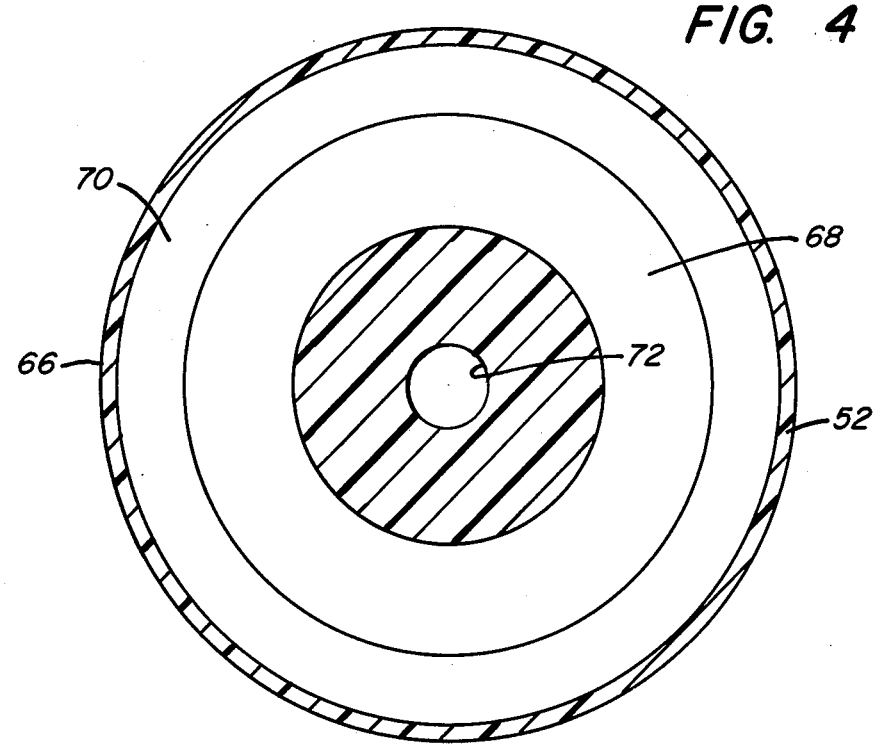
FIG. 4 is a view of a rotary member for a brushless resolver showing the movable input foils formed thereon which are capacitively coupled to the foils shown in FIG. 3.

The side of rotary member 52 which faces stationary member 54 is shown in FIG. 4. Rotary member 52 is formed of an insulating material and has side 66 facing stationary member 54, on which are formed concentric conducting foils 68 and 70. Foils 68 and 70 on side 66 are the same relative size as foils 58 and 60 on member 54. Foils 68 and 70 face foil 58 and 60 respectively. Foils 68 and 70 are capacitively coupled to foils 58 and 60, respectively. The capacitive coupling between foils 58, 68 and 60, 70 does not vary as rotatable member 52 is rotated with shaft 12, but remains relatively constant. Rotatable member 52 has a center opening 72 formed therein which can be fitted around shaft 12. Rotatable member 52 is connected to shaft 12 by suitable means such as bolting to a hub attached to shaft 12.

Figure 5:
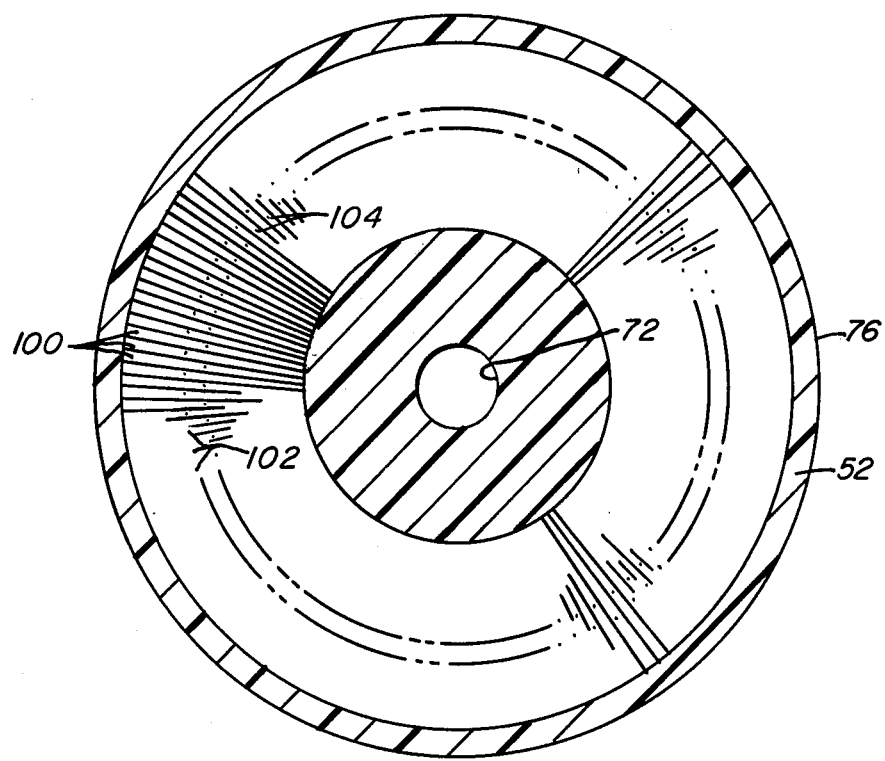
FIG. 5 is a view of the other side of the rotary member shown in FIG. 4 illustrating the movable output foils mounted thereon.

FIG. 5 shows the back side 76 of rotatable member 52, whose input side is shown in FIG. 4. Side 76 of rotatable member 52 has a plurality of conducting foils printed thereon. Each foil segment 100 is separated from the adjacent foil by an insulating space. One hundred eighty segments 100 are provided around side 76. Each segment 100 is electrically connected through member 52 to foil 68 or 70. Pins 102 connects segments 100 to foil 70 and pins 104 connect segments 100 to foil 68. Every other foil 100 is connected to foil 68 and the foils in between these are connected to foil 70. Connections 102 and 104 can be electric plated holes formed through insulating members 52. Foils 68 and 70 shield segments 100 from capacitive coupling with foils 58 and 60 to prevent undesirable harmonics from being present on the carrier signal between ouput segments 100.

Figure 6:
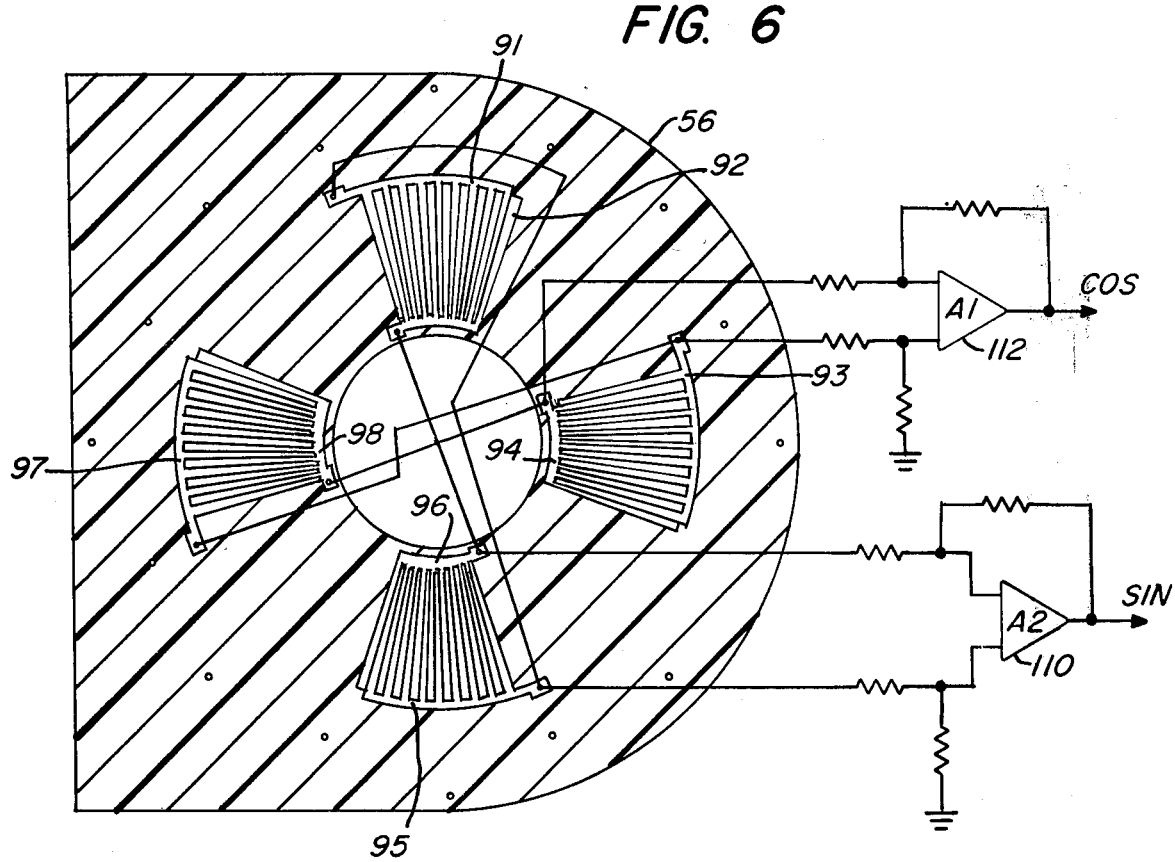
FIG. 6 is a view of the output stationary member showing the stationary output foils which are capacitively coupled to the foil shown in FIG. 5 to provide the quadrature position output signals.

Facing side 76 of rotatable member 52 is stationary output member 56 shown in FIG. 6. Regardless of the number of poles the stationary input foils 58 and 60 configuration and movable input foils 68 and 70 configuration remain generally the same. That is these foils or conductors 58, 60, 68 and 70 will normally be formed as concentric surfaces with approximately the same area. For a 180 pole resolver, foil segments on side 76 are formed as shown in FIG. 5; that is, 180 movable foil segments are provided. The stationary output segments 91-92, 93-94, 95-96 and 97-98 are provided on member 56. Foil segments 91, 93, 95 and 97 are formed with a top conducting portion with elongated conducting areas or fingers extending therefrom towards the center of member 56. These fingers are seperated from the fingers extending from associated foil members 92, 94, 96 and 98 by an insulating separation. Foil areas 92, 94, 96 and 98 include an inside circular portion with elongated conducting foils or fingers extending therefrom which are interleaved with the extending foils from portions 91, 93, 95 and 97. Foils 91, 92, 95 and 96 are utilized for providing a sine indication. Foils 93, 94, 97 and 98 are utilized for providing a cosine indication. The number of fingers on each foil segment 91 through 98 is not critical, however, an increase number provided an increased output signal strength. The output of amplifier 112 is a cosine function that goes through 180 complete sine cycles as rotary member 52 is rotated through one complete revolution. Likewise, the output of amplifier 110 is a sine indication which goes through 180 complete sine cycles as rotary member 52 is rotated through a complete revolution. Thus the output of amplifier 112 is a carrier function whose envelope defines the cosine position and the output of amplifier 110 is a carrier function whose envelope defines the sine position. While all the segments are not required on output member 56, the extra segments are provided for increase foil area to provide an increased area for capacitive coupling and thus greater signal strength. For capactive coupled resolvers having a small number of poles it has been noted that it is desirable to shape the foils to obtain a good sine-cosine output, however, for a large number of poles shaping is not necessary.

FIG. 2 shows a detailed diagram of brushless tachometer 10. For the embodiment shown in FIG. 2 servo motor 14 is coupled to resolver 16 to provide the mechanical input thereto. Since the output impedance of the printed circuit capacitive coupled resolver 16 is rather high, differential amplifiers $A_1$ and $A_2$ are provided on the output to increase signal strength. Thus a strong output signal is present to be transmitted to the side band splitting circuit 50. The output of amplifier $A_1$ is a voltage $V_1$. Voltage $V_1 = V_c K_1 \cos \omega t \sin 90\omega_m t$. The output of amplifier $A_2$ is a voltage $V_2$. Voltage $V_2 = V_c K_1 \cos \omega t \cos 90\omega_m t$. These signals provide the input to the side band splitter circuit 50 which consists of resistors R and $R_1$ and capacitors C and $C_1$. $\omega_m$ is the rotating shaft angular frequency. Capacitor C is sized so that the magnitude of the reactance $X_c$ is approximately equal to the magnitude of the resistance R at the angular frequency $\omega$. In this example the frequency of the carrier is 10 KHz. $C_1$ is selected so that the absolute value of the reactance $Xc_1$ is approximately equal to the resistance $R_1$ at the frequency of 10 KHz. Capactior $C_1$ and resistor $R_1$ are connected in series, across the output of amplifiers $A_1$ and $A_2$, with one output from said band splitter 50 being provided at their point of common connection. Capacitor C and resistor R are connected in series across the output of amplifiers $A_1$ and $A_2$, with the other output from side band splitter 50 being provided at their common connection point. The end of capacitor C not directly electrically connected to resistor R is directly electrically connected to resistor $R_1$. The end of capacitor $C_1$ not directly electrically connected to resistor $R_1$ is directly electrically connected to resistor R.

Output voltage $V_3$ has a component of its frequency which is dependent on the speed of rotation of shaft 12. $V_3 = V_c K_2 \cos (\omega t + 90\omega_m t)$. It can thus be seen that the rotating shaft angular frequency $\omega_m$ becomes multiplied by the number of resolver poles divided by 2. Thus the frequency of $V_3$ contains a useful proportion which is related to speed. Likewise the frequency of output signal $V_4$ is also dependent on the rotating shaft angular frequency times the number of resolver poles divided by two. $V_4 = V_c K_2 \cos (\omega t - 90\omega_m t)$. The output voltage signals $V_3$ and $V_4$ are fed to amplifiers $A_3$ and $A_4$ which provide a square wave output from the sine wave input. $A_3$ and $A_4$ convert $V_3$ and $V_4$ to square waves of the same frequency. The square wave output of amplifier $A_3$ has a frequency of $\omega + 90\omega_m$. The square wave output of amplifier $A_4$ has a frequency of $\omega + 90\ \omega_m$. Amplifier $A_3$ feeds a monostable multivibrator 22 and amplifier $A_4$ feeds a monostable multivibrator 24. The outputs of the monostable multivibrators 22, 24 are a fixed pulse width variable frequency pulse train. A portion of the DC levels of these monostable multivibrators 22, 24 are a function of the shaft frequency $\omega_m$. The monostable multivibrator output voltages are equal when $\omega_m = 0$ and thus the output $V_0$ of the differential amplifier $A_5$, is equal to 0. The output voltage signal is bi-directional, with the sign changing when the direction of rotation of the instrumented shaft 12 is reversed.

Low pass filters 26 and 28 are provided after multivibrators 22 and 24 respectively to remove the alternating current portion of signals $V_5$ and $V_6$. The outputs of the low pass filters 26 and 28 are differentially combined by amplifier $A_5$ which provides the desired DC output voltage $V_0$.

The following are representative values for various circuit components utilized in tachometer 10:

| | |
|---|---|
| R, $R_1$ | 10 KΩ |
| C, $C_1$ | .0159uf |
| $R_2$, $R_3$ | 10 KΩ |
| $R_4$, $R_5$ | 100 KΩ |

The following example is for an output shaft speed of 3600 revolutions per minute. When $\omega_m$ is equal to 3600 revolutions per minute the frequency of $V_3$ is $10,000+(60\times 90)=15,400$ hertz. The frequency of $V_4$ is $10,000\times(60\times 90)=4600$ hertz. Thus the average dc value of the output of multivibrator 22 exceeds the output of multivibrator 24 and the output of differential amplifier $A_5$ will be negative. When $\omega_m$ is negative the DC level of $V_6$ will exceed that of $V_5$ and the output will be positive. The DC output voltage $V_0$ varies linearly with $\omega_m$. A slight change in carrier frequency will not change the output voltage since only the differential level of $V_5$ and $V_6$ is used to determine the output voltage.

What is claimed is:

1. A brushless tachometer for providing a DC output voltage indicative of the speed of a rotatable shaft comprising:
    a multi-pole brushless resolver connected to the shaft to be instrumented for providing modulated sine and cosine position indications;
    an oscillator providing a modulating input signal to said resolver;
    a side band splitting circuit connected to receive the modulated sine and cosine position indications and providing two output signals whose frequencies difference is representative of shaft speed;
    frequency to voltage converting means connected to receive the two output signals from said side band splitter circuit and providing two output voltage signals wherein each voltage output signal is a function of the frequency of one of the two input signals; and,
    a comparator for comparing the two output signals from said frequency to voltage converting means and providing a different signal whose magnitude is indicative of shaft speed and whose sign is indicative of the direction of shaft rotation.

2. A brushless tachometer as claimed in claim 1 wherein said side bands splitting circuit comprises:
    a first resistor and a first capacitor connected in series across the output of said brushless resolver with the capacitor sized so that the magnitude of its reactance is approximately equal to the magnitude of the resistors' resistance at the carrier frequency; and,
    a second capacitor and a second resistor connected in series across the output of said brushless resolver with one input to the second capacitor connected to the first resistor and with said second capacitor sized so that the reactance of the second capacitor is approximately equal in magnitude to the resistance of the second resistor at the carrier frequency.

3. A brushless tachometer as claimed in claim 1 wherein said frequency to voltage converting means comprises:
- a pair of monostable multivibrators connected to receive the outputs from said side band splitting circuit; and,
- a low pass filter connected to the output of each monostable multivibrator.

4. A brushless tachometer for indicating shaft speed comprising:
- a multi-pole resolver having a mechanical connection to the shaft and providing a first voltage signal $V_1$ and a second voltage signal $V_2$;
- an oscillator electrically connected to said multi-pole resolver for providing a carrier frequency;
- said first voltage signal $V_1$ being a sine position indication defined by the envelope of the carrier;
- said second voltage signal $V_2$ being a cosine position indication defined by the envelope of the carrier;
- a phase shifting circuit connected to receive said first signal $V_1$ and said second signal $V_2$ and providing a third signal output $V_3$ and a fourth output signal $V_4$;
- said third signal $V_3$ having a frequency which is a function of the carrier frequency the number of resolver poles, and the shaft angular frequency;
- said fourth signal $V_4$ having a frequency which is a function of the carrier frequency, the number of resolver poles, and the shaft angular frequency;
- a first frequency to voltage converter means for connected said third voltage signal, $V_3$, to a fifth voltage signal, $V_5$, whose magnitude is determined by the frequency of the fourth voltage signal $V_4$; and,
- a second frequency to voltage converter means for converting said fourth voltage signal, $V_4$, to a sixth voltage signal $V_6$ whose magnitude is determined by the frequency of the fourth voltage signal $V_4$; and,
- comparator means for differentially combining the fifth voltage signal and the sixth voltage signal to provide an output signal $V_0$ which is a DC signal whose magnitude indicates shaft speed.

5. A tachometer as claimed in claim 4 wherein:

$$V_1 = V_c K_1 \cos \omega_c t \sin 90 \omega_m t$$

$$V_2 = V_c K_1 \cos \omega_c t \cos 90 \omega_m t$$

$$V_3 = V_c K_2 \cos (\omega_c t + 90 \omega_m t)$$

$$V_4 = V_c K_2 \cos (\omega_c t - 90 \omega_m t)$$

$$V_0 = V_c K \omega_m$$

where
- $\omega_c$ is equal to $2\pi$ times the oscillator frequency
- $\omega_m$ is equal to the rotating shaft angular frequency
- $V_c$ is the oscillator voltage
- $K, K_1, K_2$ are constants.

6. A tachometer for providing a DC signal which is indicative of the direction and speed of rotation of a shaft comprising:
- an oscillator;
- a multi-pole resolver receiving an input modulating signal from said oscillator and having a mechanical connection to the shaft and providing output modulated sine and cosine position indications;
- phase shifting circuit means connected to receive as inputs the modulated sine and cosine position indications for providing two output signals one of whose frequency increases with shaft speed and the others whose frequency decreases with shaft speed;
- frequency to voltage converting means for converting the two output signals from said phase shifting circuit to two voltage signals one of whose DC voltage level increase with shaft speed and the other whose DC voltage level decreases with shaft speed; and,
- combining means for combining the two voltage signals from the frequency to voltage converting means for providing a DC signal whose magnitude is indicative of shaft speed and whose sign is indicative of the direction of rotation.

7. A tachometer as claimed in claim 6 wherein:
- one of the two output signals from the phase shift circuit means comprises a constant component determined by the carrier frequency and a variable component directly related to shaft speed; and,
- the other of the two output signals from the phase shift circuit means comprises a constant component determined by the carrier frequency and a variable component inversely related to shaft speed.

8. A tachometer as claimed in claim 7 wherein said frequency to voltage converting means comprises:
- a pair of monostable multivibrators each receiving one of the two output signals from said phase shifting circuit; and,
- a low pass filter connected to the output of each monostable multivibrator for removing the carrier portion of the associated signal.

* * * * *

UNITED STATES PATENT AND TRADEMARK OFFICE
CERTIFICATE OF CORRECTION

PATENT NO. : 4,199,800

DATED : April 22, 1980

INVENTOR(S) : James G. Weit

It is certified that error appears in the above—identified patent and that said Letters Patent are hereby corrected as shown below:

Column 1, line 51, delete "guadrature" and substitute --quadrature--

Column 3, line 43, delete "copening" and substitute --copending--

Column 4, line 13, delete "foil" and substitute --foils--

Column 6, line 23, delete "10,000 X (60 x 90)" and substitute --10,000 - (60 x 90)--

Signed and Sealed this

First Day of July 1980

[SEAL]

Attest:

SIDNEY A. DIAMOND

Attesting Officer     Commissioner of Patents and Trademarks